(No Model.)
E. SOLVAY.
PROCESS OF MAKING CHLORINE.
No. 420,837. Patented Feb. 4, 1890.
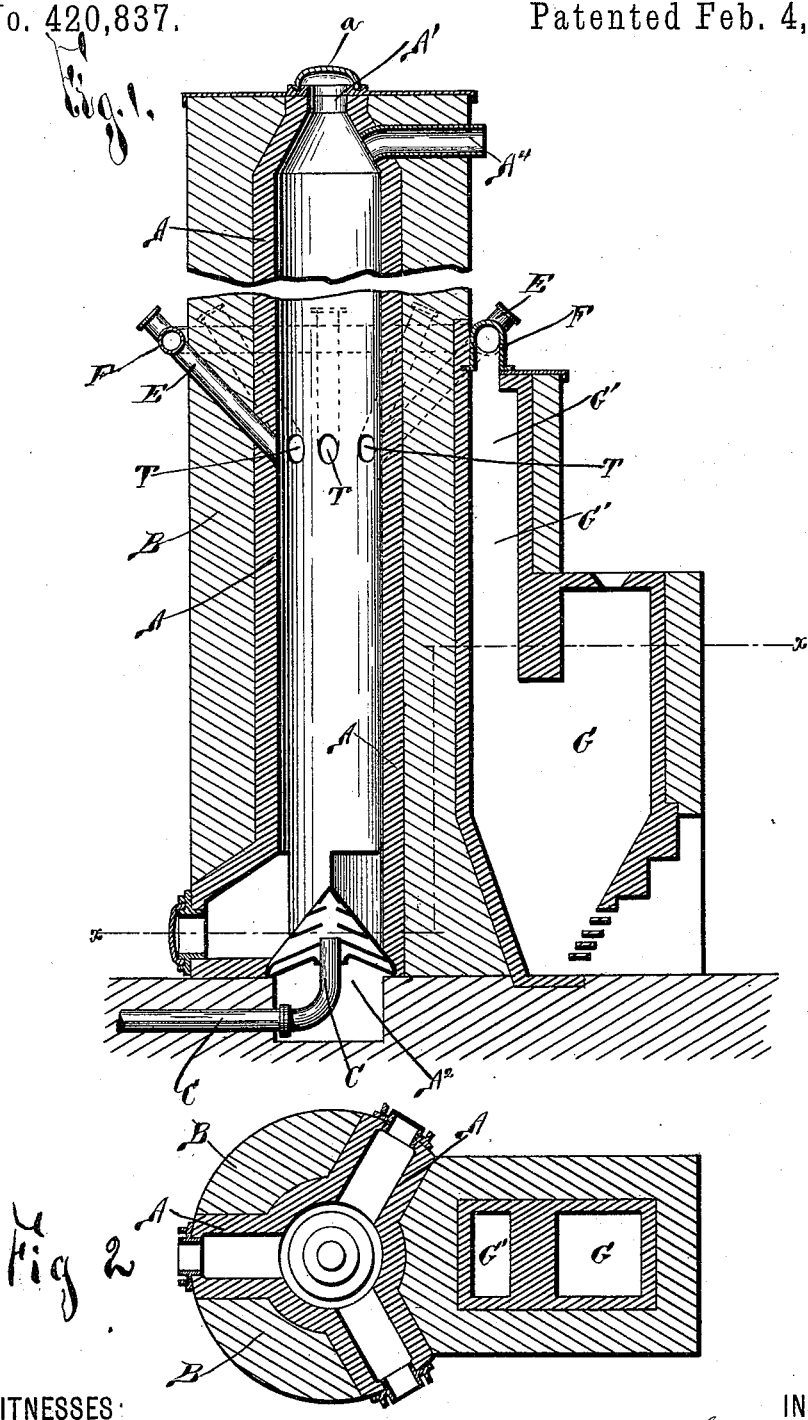
WITNESSES
INVENTOR
Ernest Solvay
BY
ATTORNEY

UNITED STATES PATENT OFFICE.

ERNEST SOLVAY, OF BRUSSELS, BELGIUM, ASSIGNOR TO THE SOLVAY PROCESS COMPANY, OF SYRACUSE, NEW YORK.

PROCESS OF MAKING CHLORINE.

SPECIFICATION forming part of Letters Patent No. 420,837, dated February 4, 1890.

Application filed February 14, 1889. Serial No. 299,918. (No model.) Patented in Belgium January 5, 1888, No. 82,050.

*To all whom it may concern:*

Be it known that I, ERNEST SOLVAY, of Brussels, Belgium, have invented new and useful Improvements in the Process of Evolving Chlorine, of which the following, taken in connection with the accompanying drawings, is a full, clear, and exact description.

My invention relates to improvements in the art of producing or evolving chlorine, (for which I have received Belgian Patent No. 82,050, dated January 5, 1888,) and has for its object a simple and effective manner of producing chlorine at a minimum cost of expense; and to this end it consists, essentially, in first calcining in a suitable furnace the clay to be mixed with the chlorine, then placing the calcined clay mixed with calcium chloride or other chloride into a high tower, having tuyeres leading thereinto about midway the height thereof, and forcing a blast of air upward from the bottom of the furnace or tower, all as hereinafter more fully described, and pointed out in the claims.

In describing my invention reference is had to the accompanying drawings, forming a part of this specification, in which like letters indicate corresponding parts in all the views.

Figure 1 is a vertical section of the tower used for decomposing the calcium chloride mixed with the calcined clay; and Fig. 2 is a horizontal section of said furnace, taken on line $x$ $x$, Fig. 1.

I have discovered that mixtures of calcium chloride and a silicious clay-like substance give better results than a purely silicious base when decomposed for the purpose of producing chlorine gas. I have also observed that it is impossible to dry such a mixture up to the point of causing it to lose all its water without disengaging hydrochloric acid.

As there certainly is an advantage in reducing the quantity of hydrochloric acid formed at the same time with the chlorine, I calcine the silicious clay first separately, so as to drive off the water which it contains and to obtain a decomposing material, which has at the same time the advantages of silicious and of clay-like materials. This calcination can be accomplished by putting the clay, in the form of small bricks, into an appropriate furnace and afterward reducing it to powder.

Since there are various forms of furnaces which would be suitable for the calcination of the clay, it is unnecessary in my invention to illustrate or describe any particular kind, it being merely necessary to state that before its mixture with the calcium chloride the clay is calcined by any suitable furnace and is afterward reduced to powder by any of the well-known means.

In the previous manufacture of chlorine it has been customary to so form the furnaces for decomposing the material containing chlorine and evolving the same therefrom as to exclude from the field of reaction the combustible or carbonated gases. Chlorine has a strong affinity for carbonic oxide, forming therewith oxychloride of carbon or carbonyl chloride, from which the chlorine cannot be recovered in its active state. With this fact in view it has been customary to decompose the chlorine-containing material by means of furnaces heated from the outside, thus preventing the entrance of carbonic oxide and the consequent forming of oxychloride or carbon. This process of evolving chlorine by heating from the outside necessitates the use of a great amount of fuel and greatly adds to the cost of production.

By means of the furnace illustrated in the drawings and described and claimed in my apparatus application of even date herewith I introduce the carbonic oxide directly into the decomposing-chamber, but by the peculiar arrangement of the parts of the same prevent the forming of oxychloride of carbon gas.

A represents the decomposing-furnace, consisting of a high tower having a thick envelope of non-conducting material B, preventing radiation therefrom.

In the upper part of the furnace A is an opening A', having a removable cover or cap, and into this opening a mixture of calcium chloride and calcined silicious clay is inserted until the tower is filled.

In the lower part of the furnace I provide the opening $A^2$, into which the pipe C discharges and forces a current of air into the lower part of the furnace, from whence it constantly ascends.

Interposed between the openings A' and A², about midway the height of the furnace, I provide apertures or tuyeres T, through which a crown of pipes E discharge the fuel, preferably carbonic oxide. The pipes E are connected by a suitable main or connecting pipe D to the discharge G' of the furnace G.

Coal or other fuel is placed in the furnace G, and the fire is so regulated that an abundance of carbonic oxide is produced and conducted from the flue or discharge G' of the furnace G to the main D, whence it is inserted into the midst of the material in the furnace A by means of the pipes E, discharging through the tuyeres T. The air inserted from the bottom of the furnace A brings about the combustion of the carbonic oxide, and is supplied in sufficient quantities to combine with the calcium chloride mixed with the silicious clay-like substance and to produce the reaction $3CaCl_2 + Al_2(SiO_3)_3 + 3O = Al_2O_3 - 3CaSiO_3 + 3Cl_2$. The combustion of the carbonic oxide soon heats to a white heat the material on a level with the tuyeres forming the combustion-zone of the furnace. This zone extends only a short distance, and immediately above the same is the decomposing-zone, in which the material is heated to a red heat and is thoroughly decomposed before its contact with the carbonic oxide in the combustion-zone, thus preventing the formation of oxychloride of carbon.

The peculiar arrangement of the tuyeres and the manner of recovering the heat, as presently explained, bring about a perfect combustion of the carbonic-oxide gas, and the heat is sufficiently intense to thoroughly decompose the material before its entrance into the combustion-zone and its consequent meeting with the fresh carbonic-oxide gas discharged through the tuyeres. The carbonic oxide uniting with an atom of oxygen of the introduced air forms carbonic anhydride, which is discharged through the discharge-opening A⁴ at the same time with the chloride gas; but as there is no affinity between the two gases they do not unite with each other and may be readily separated, as in my process application of forming chloride of lime of even date herewith. The gases produced would carry off a great share of heat were it not for the fact that the combustion-zone is about midway the height of the furnace A, and the weight of material presses down upon the gases and causes them to pass slowly therethrough and impart their heat to the material, which is substantially cold, thus preventing loss of heat. The material having been acted upon gradually sinks to the bottom of the furnace, whence it is readily removed by suitable openings A³, provided therein. Considerable loss of heat would accrue from the constant feeding downward of the decomposed material were it not that the current of cold air rising upward through the lower part of the furnace meets the descending decomposed material and causes the same to lose its heat, carrying backward to the decomposing-zone and heating the air before its contact with the carbonic oxide and the chloride mixture in the combustion-zone, thus greatly facilitating the combustion. This process is exceedingly simple, and is very effective in the production of chlorine gas, and it will be understood that in place of the calcium chloride other chlorides which would combine with the silicon of the clay might be used, that the clay might be used without being first calcined, that the order of the steps of my process might be somewhat varied from that described, and that other changes might be made without departing from the spirit of my invention. It will also be understood that I do not restrict my invention to the use of carbonic oxide, since other fuel could be used—as, for instance, other gases or air charged with combustible dust.

Having thus fully described my invention, what I claim as new, and desire to secure by Letters Patent, is—

1. The herein-described process for the decomposition of chlorides in the dry state, the same consisting in filling into the decomposing apparatus a column of a mixture of a chloride and a silicious clay-like material, introducing gas or combustible dust midway in the decomposing apparatus, and thus producing combustion within said apparatus, and then introducing a current of air into the lower part of said decomposing apparatus, substantially as described.

2. The herein-described process of decomposing chlorides in the dry state, the same consisting in calcining a silicious clay-like material, then mixing a chloride with said calcined silicious clay-like material, filling said mixture into a decomposing apparatus, inserting gas or combustible dust midway within said apparatus, and thus producing combustion within said apparatus, and finally introducing a current of air into the lower part of said decomposing apparatus, substantially as set forth.

In testimony whereof I have hereunto signed my name, in the presence of two attesting witnesses, at the city of Brussels, Belgium, this 15th day of September, 1888.

ERNEST SOLVAY.

Witnesses:
G. HARRY,
J. A. FÜRSTENHOFF.